United States Patent
Natanzon

(10) Patent No.: US 7,840,662 B1
(45) Date of Patent: Nov. 23, 2010

(54) DYNAMICALLY MANAGING A NETWORK CLUSTER

(75) Inventor: Assaf Natanzon, Ramat-Gan (IL)

(73) Assignee: EMC(Benelux) B.V., S.A.R.L. (LU)

( * ) Notice: Subject to any disclaimer, the term of this patent is extended or adjusted under 35 U.S.C. 154(b) by 386 days.

(21) Appl. No.: 12/057,694

(22) Filed: Mar. 28, 2008

(51) Int. Cl.
G06F 15/173 (2006.01)
(52) U.S. Cl. .............. 709/223; 709/209; 714/4
(58) Field of Classification Search .......... 709/201, 709/223–224, 208, 209; 714/1, 2, 15, 4
See application file for complete search history.

(56) References Cited

U.S. PATENT DOCUMENTS

| | | | |
|---|---|---|---|
| 5,944,793 A * | 8/1999 | Islam et al. .............. 709/220 |
| 6,115,830 A * | 9/2000 | Zabarsky et al. .......... 714/15 |
| 6,625,639 B1 * | 9/2003 | Miller et al. ............. 718/106 |
| 7,069,320 B1 * | 6/2006 | Chang et al. .............. 709/225 |
| 7,203,748 B2 * | 4/2007 | Hare et al. ............... 709/224 |
| 7,480,816 B1 * | 1/2009 | Mortazavi et al. .......... 714/4 |
| 7,738,404 B2 * | 6/2010 | Deb et al. ................. 370/255 |
| 2003/0204273 A1 * | 10/2003 | Dinker et al. ............. 700/48 |
| 2003/0204625 A1 * | 10/2003 | Cain ...................... 709/243 |
| 2004/0221149 A1 * | 11/2004 | Rao et al. ................. 713/2 |
| 2005/0132154 A1 * | 6/2005 | Rao et al. ................. 711/162 |
| 2005/0198359 A1 * | 9/2005 | Basani et al. ............. 709/232 |
| 2005/0262381 A1 * | 11/2005 | Ishida ...................... 714/4 |
| 2006/0167921 A1 * | 7/2006 | Grebus et al. ............. 707/102 |
| 2008/0040628 A1 * | 2/2008 | Mandal .................... 714/4 |
| 2008/0281959 A1 * | 11/2008 | Robertson ................. 709/224 |
| 2009/0177743 A1 * | 7/2009 | Ashour et al. ............. 709/204 |

* cited by examiner

*Primary Examiner*—Oanh Duong
(74) *Attorney, Agent, or Firm*—Daly, Crowley, Mofford & Durkee, LLP

(57) ABSTRACT

In one aspect, a method of dynamically adding a new node includes determining if the new node is included in a list of nodes belonging to a network cluster, notifying the leader node if the new node is not included in the list, adding the new node to the list and notifying the new node that it is a member of the network cluster. In another aspect, a method of dynamically removing a node includes determining if the node is functioning and if not, removing the node from a list of nodes belonging to a network cluster. In a further aspect, a method of dynamically managing a network cluster includes determining if a twin of a node is malfunctioning, removing the twin from a twin state of the node, removing the twin from a leader candidate list and adding a new node to the leader candidate list.

20 Claims, 7 Drawing Sheets

DYNAMICALLY MANAGING A NETWORK CLUSTER

BACKGROUND

In a network environment, it is important to have only one node as a leader node (i.e., a master), while the other nodes in the network are not leaders nodes (i.e., slaves) so that not more than one node attempts to perform the same task. Different nodes performing the same tasks cause data corruption. One approach, called a majority approach, includes at least three or more nodes in a network. If a majority of the nodes in the network are functioning properly and communicate with each other, the majority of nodes can elect a leader node. If less than half or exactly half of the nodes can detect each other, a leader node will not be elected because two different leader nodes could be selected (e.g., if two portions of a network cannot detect each, each portion would choose its own leader node).

SUMMARY

In one aspect, a method of dynamically adding a new node to a network cluster includes determining if the new node is included in a list of nodes belonging to the network cluster, notifying the leader node if the new node is not included in the list, adding the new node to the list and notifying the new node that it is a member of the network cluster.

In another aspect, a method of dynamically removing a node from a network cluster includes determining if the node is functioning and if the node is malfunctioning, removing the node from a list of nodes belonging to the network cluster.

In a further aspect, a method of dynamically managing a network cluster in a storage area network (SAN) includes determining if a twin node of a node is malfunctioning, removing the twin node from a twin state of the node, removing the twin node from a leader candidate list and adding a new leader candidate node to the leader candidate.

In a still further aspect, a network cluster in storage array network includes a storage array including a list of nodes in the network cluster and a list of leader candidate nodes. The network cluster also includes the leader candidate nodes including a first node designated as a leader node and a second node designated as a twin node configured to become the leader node if the first node fails. The network cluster is configured to dynamically re-elect a new leader candidate node by determining if the twin node is malfunctioning, removing the twin node from a twin state stored at the node, removing the twin node from a leader candidate list and adding a new leader candidate node to the leader candidate.

DETAILED DESCRIPTION

Described herein is an approach to dynamically manage a network cluster. For example, the approach includes dynamically re-electing a leader candidate node in the network cluster to ensure redundancy. In another example, the approach includes dynamically adding nodes to and removing nodes from the network cluster. While the techniques described herein are directed to a storage area network (SAN), these techniques may also be applied to any type of network cluster. As used herein "dynamically" refers to automatically managing the network cluster without user intervention. For example, if a leader node or its backup crashes, there will not be a single point of failure for a long period of time afterwards whereas in prior art network clusters, if a leader node and its backup crashes the whole network cluster is down until a user configures a change.

Figure 1:
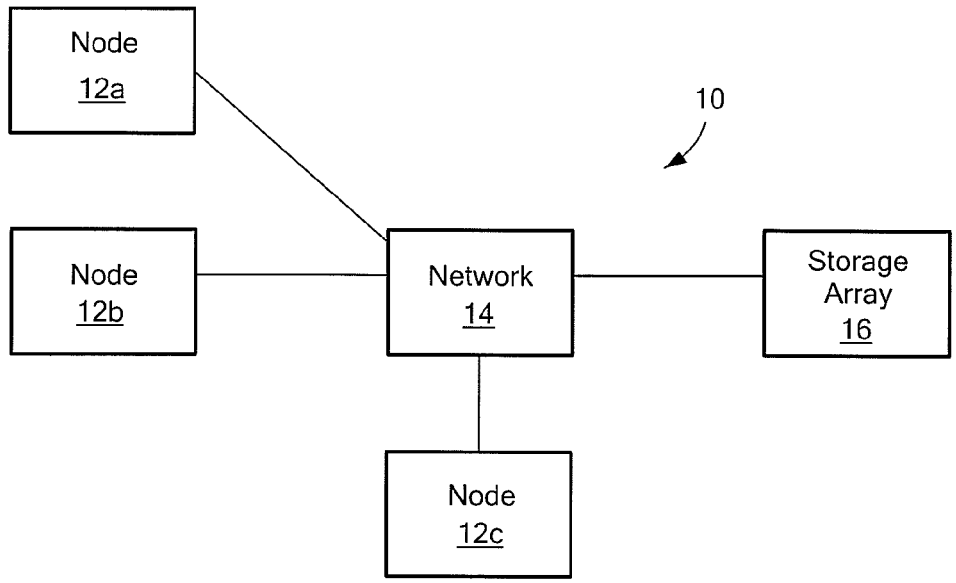
FIG. 1 is a simplified diagram of a network cluster.

Referring to FIG. 1, a network cluster 10 includes a node 12a, a node 12b, a storage array 16 and a node 12c each connected to a network 14 (e.g., a local area network (LAN), a wide area network (WAN) and so forth). As used herein the node 12a is called a "twin" of the node 12b and the node 12b is a "twin" of the node 12a. The nodes 12a, 12b are referred herein as leader candidate nodes. Leader candidate nodes are capable of being selected as a leader node (i.e., a master). For example, if the node 12a is selected as a leader node (i.e., a master) in the network cluster 10, to ensure redundancy, the node 12b, the twin of the node 12a, is a backup leader node (i.e., slave) to the node 12a and in the event that the node 12a fails can become the leader node.

Figure 2:
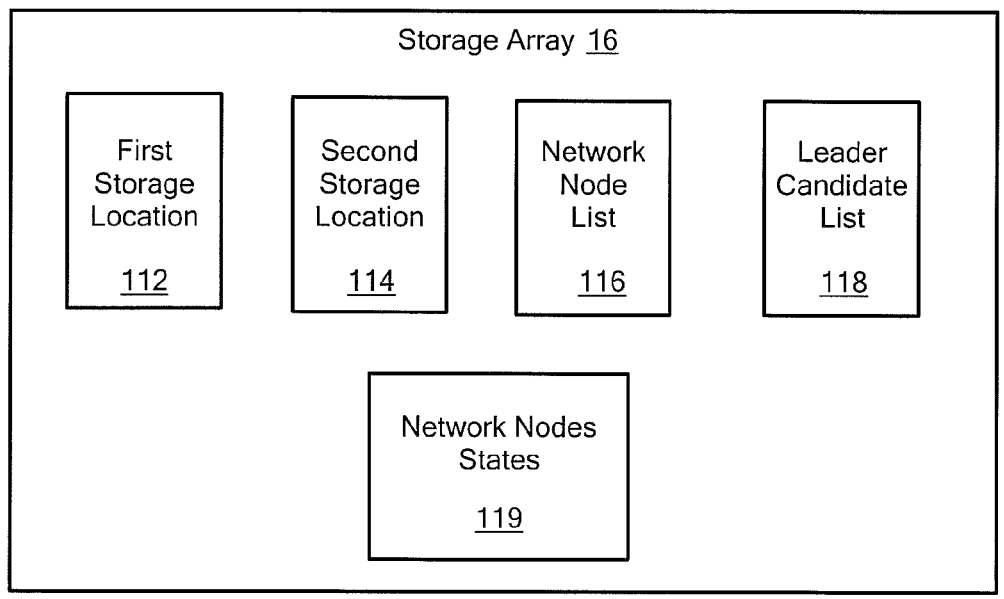
FIG. 2 is a block diagram of a storage array.

Referring to FIG. 2, the storage array 16 includes a first storage location 112, a second storage location 114, a network node list 116, a leader candidate list 118 and network node states 119. As will be shown below, the first storage location 112 and the second storage location 114 are used by the node 12a and the node 12b in determining if their respective twin node 12b, 12a is functioning properly. The network node list 116 includes a list of the nodes belonging to the network cluster 10. The nodes in the network cluster 10 include the host 12a, the host 12b and the node 12c. In one embodiment, the list of nodes includes node IDs of the nodes. The leader candidate list 118 includes the nodes that are designated as leader candidate nodes which includes up to two nodes, for example. In other embodiments, the network node list 116 and the leader candidate list 118 may be combined in a tabular format with a field indicating whether the node is a leader candidate node.

The network node states 119 include the local states (e.g., a local state 132 in FIG. 3) of the nodes in the network cluster 10, for example, the node 12c. In one particular example, since node 12c cannot be a leadership candidate node, the state of node 12c is either in a member state or in an initializing state as explained below. In one example, each node in the network cluster 10 writes its local state (e.g., the local state 132) to the network node states 119.

In one embodiment, a leader candidate node is a leader candidate node if it either reads from the leader candidate list 118 at the storage array 16 that it is a leader candidate node, or it is read from internal state 144 that it is a leader candidate and the twin node acknowledges that it is a leader candidate node (over the network 14). For example, when a node 12a starts up if its internal leader candidate list 144 indicates that the node 12a is a leader candidate node, it becomes a tentative leader candidate node and if its twin node 12b (the other node in the leader candidate list 144) also acknowledges that they are actually twins, then the node 12a becomes a leader candidate node. However, if the twin node 12b does not agree with being a twin node of the node 12a, then the node 12a is no longer considered a leader candidate node and will amend a leader candidate list 144 (FIG. 3) at the node 12a. In a second example, if the node 12a reads from the leader candidate list 118 of the storage array 16 and determines that it is a leader candidate node then it becomes a leader candidate node (and updates its leader candidate list 144 with this value).

Figure 3:
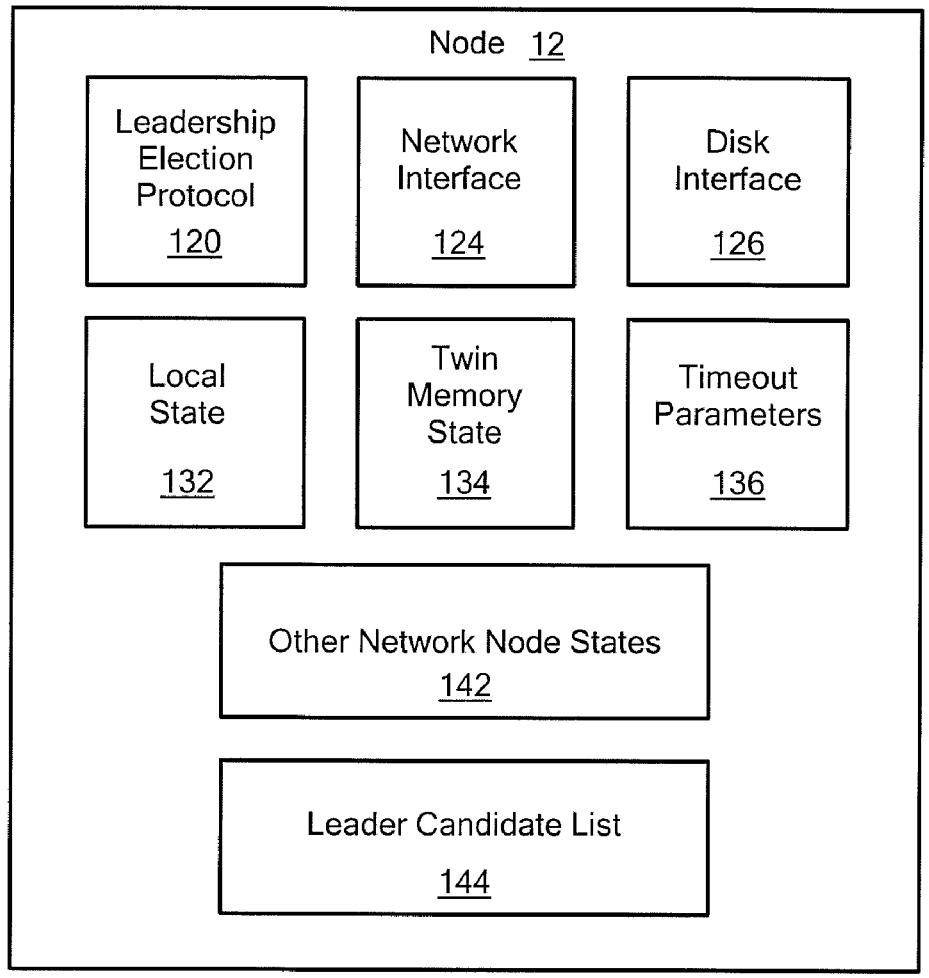
FIG. 3 is a block diagram of a node.

Referring to FIG. 3, each node 12 (e.g., the node 12a, the node 12b, the node 12c) includes a leadership election protocol (LEP) 120, network interfaces 124 and a disk interface 126. In one example, prior to running the LEP 120 for the first time, a user configures one node as the leader candidate which will run the LEP 120 and become the leader node after which the LEP 120 adds and removes nodes in the network cluster 10, re-elects a new leader candidate that will become leader if the leader node fails and re-elects a new twin node if the twin node fails. Node 12 also includes a local memory state 132, a twin memory state 134, the timeout parameters 136, other network node states 142 and the leader candidate list 144. For example, the local state may be one of at least three states: (1) a first local state indicating that the node is a member of the network cluster 10 (2) a second local state indicating that the node is in an initialized state or (3) a third local state indicating that LEP 120 has chosen the local node as the leader node, the twin state is either alive or leader or dead.

In one example, when a node 12a, 12b is powered, the LEP 120 initially starts in an initializing state and if the node is not stable, the node will remain in the initializing state. If the node 12a, 12b is stable then after 30 seconds, for example, the node 12a, 12b will either become a leader node or a member of the cluster. In one example, there are at most two leader candidate nodes so that when there are more than two nodes in the network cluster 10 just two of them are leadership candidate nodes and may become leader nodes, while the others nodes that are not leader candidate nodes will become members after initialization. If a node 12a, 12b is in a member or leader state and becomes unstable, the node will reboot.

The twin state 134 identifies the twin node and stores the twin state indicating the state of the host's twin node. For example, the twin state indicates that the twin node is one of "alive," meaning that its twin state is either unknown or the twin node is functioning properly but not the leader node; a "leader," meaning that the twin node is the leader node (and not the local node), or "dead" indicating that the interfaces to access the twin node indicate that the twin node is not functioning. In one example, the leader candidate nodes maintain the twin state 134.

The timeout parameters 136 include a write timeout corresponding to the time allowed to make a write access to the storage array 16, a read timeout corresponding to the time allowed to make a read access and a node connection timeout corresponding to the time allowed to make a connection to another node in the network node cluster 10. As will be explained below, the timeout parameters are used to ensure that the hosts 12a, 12b are functioning properly.

The other network node states 142 include the states of the other nodes in the network cluster 10. For example, the state of the node indicates that the other nodes is one of "alive," or "dead." In one example, not every node in the network cluster 10 maintains the other network node states 142, but rather, just the leader candidate nodes 12a, 12b do.

The leader candidate list 144 includes a list of all leader candidates. The leader candidate list 144 is updated either if the leader candidate node 12a, 12b successful reads the leader candidate nodes from the leader candidate list 118 at the storage array 16 or if the leader node 12a notifies the leader candidate node 12b over the network 14 of the candidate list 118.

The LEP 120 of a node 12a, 12b checks the interfaces iteratively to determine if its twin node 12b, 12a, for example, is functioning properly. During each iterative loop the LEP 120 attempts to contact its twin node and all other cluster nodes using the available interfaces. In one example, the twin node is considered dead if all of its interfaces (disk and network) are dead.

In particular, the LEP 120 of the nodes 12a, 12b use the network interfaces 124 and the disk interface 126 to determine if its twin node 12b, 12a is functioning properly by establishing connections with the storage array 16 through the disk interface 126 and/or directly communicating to its twin node through the network interfaces 124. Based on the status of these connections, the LEP 120 determines a leader node.

For example, the LEP 120 attempts multiple network connections through network interfaces 124 to contact its respective twin node. For example, two of the network connections may be a local area network (LAN) and the other may be a wide area network (WAN). Contacting a twin sending node through the network interfaces 124 is performed by sending messages that include the local time the message was issued and the last "local time" of the twin node as received in the last network message. A successful network connection is determined if the message is sent and a return message received within a node connection timeout.

In another example, the disk interface 126 is used by the nodes 12a, 12b to determine if its twin node is connected and functioning properly by writing and reading data to specific locations on the storage array 16. For example, the node 12b writes to the second storage location 114. In order for the node 12a to determine if host 12b is functioning properly, the node 12a reads the entries made at the second storage location 114. Likewise, the node 12a writes to the first storage location 112 and the node 12b reads the entries made at the first storage location in order for the node 12b to determine if host 12a is functioning properly. In one example, the disk interface 126 may be used by a node 12a, 12b even when its respective twin node 12b, 12a is down.

A node 12a or 12b is stable if it can successfully read and write to the storage array 16 or transmit and receive a message over the network interfaces 124 within a predefined amount of time. For example, the predefined defined amount of time may be defined by the timeout parameters 136 used to determine if the nodes 12a, 12b are working properly. In one particular example, the timeout parameters 136 are used to countdown the amount of time to establish a particular connection. For example, a connection to the storage array 16 is working properly if the amount of time to conduct a disk read is 5 seconds or less (the read timeout) or the amount of time to conduct a disk write is 10 seconds or less (the write time out). In another example, a connection to the twin node is working properly if the amount of time to connect to the twin node is 5 seconds or less (the node connection timeout).

In particular, the LEP 120 of a host 12a, 12b is checking to determine if its twin node 12b, 12a is accessing the storage array 16. In write access, the communication to the storage array 16 is performed by writing a disk message containing a counter and the current state is written to a specific location on the storage array (i.e., the node 12a writes to the first storage location 112 and the node 12b writes to the second storage location 114). A message is written asynchronously to the storage array 16. A write access is successful if it ended within the write timeout In read access, the current state of the twin node is read asynchronously. The read access is successful if the read access returns within the read timeout. In read access, the communication to the storage array 16 is performed by reading the disk message containing the counter written to a specific location on the storage array (i.e., the node 12a reads from the second storage location 114 and the node 12b reads from the second storage location 112). If the current counter read from the twin node storage location 112, 114 is different from the counter previously read, then the twin node wrote to the storage array 16.

In general, the LEP 120 ensures that for every time, t, there is at most one leader node. The LEP 120 also ensures that when the network cluster 10 is stable (i.e., the connection to the storage array 16 works properly or to the twin node works properly), a leader node is selected. Afterwards, if a leader node dies and if its twin node is alive and the storage array 16 works fine, then the twin node will become the new leader node.

Once the LEP 120 selects a leader node it will remain a leader node unless the leader node is not stable in which case the leader node will be rebooted. The LEP 120 assures that a leader node will be chosen within a bounded amount of time if at least one leader candidate node is stable. The LEP 120 also reads the disk states of all other nodes in the cluster too, not just the twin node, in order to update their states.

Figure 4:
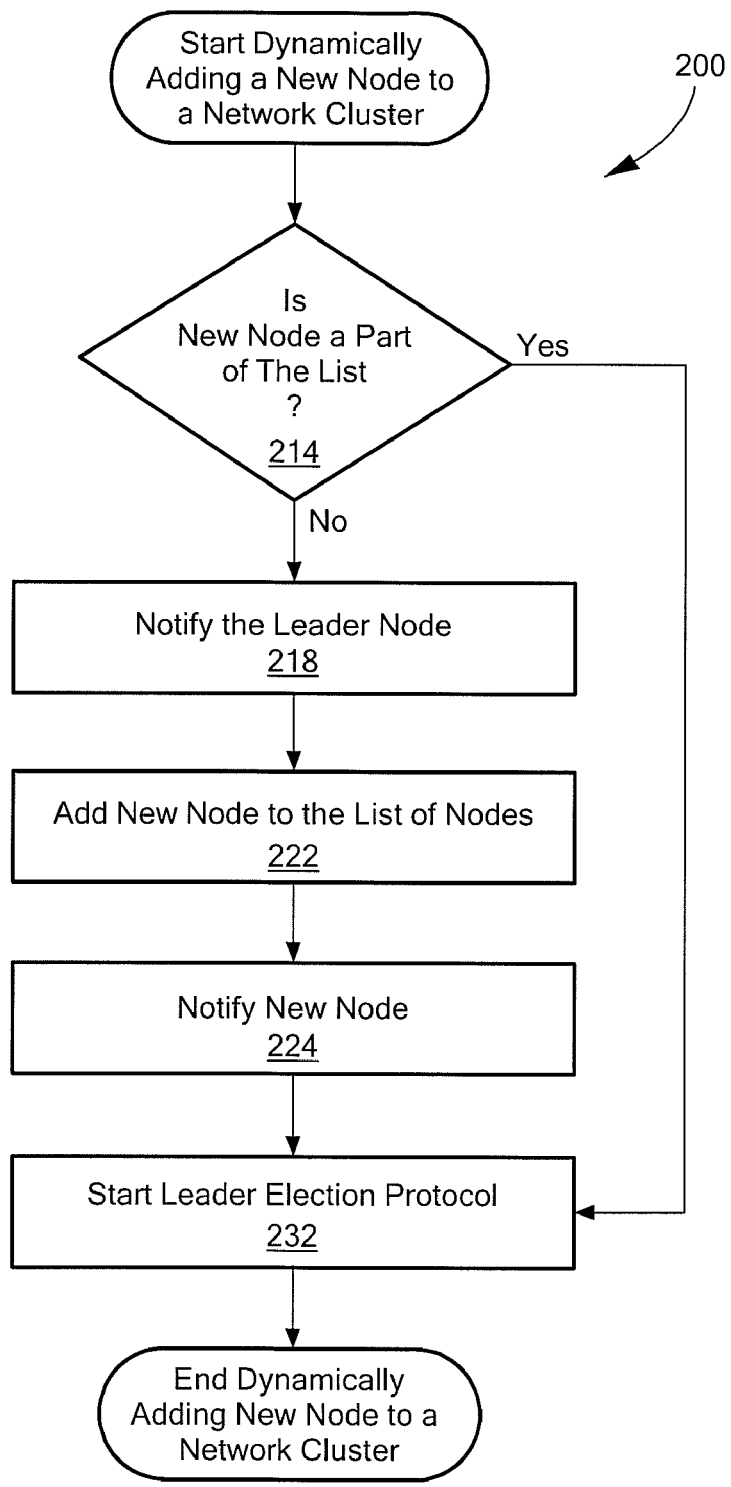
FIG. 4 is a flowchart of a process to dynamically add a network node to the network cluster.
Figure 5:
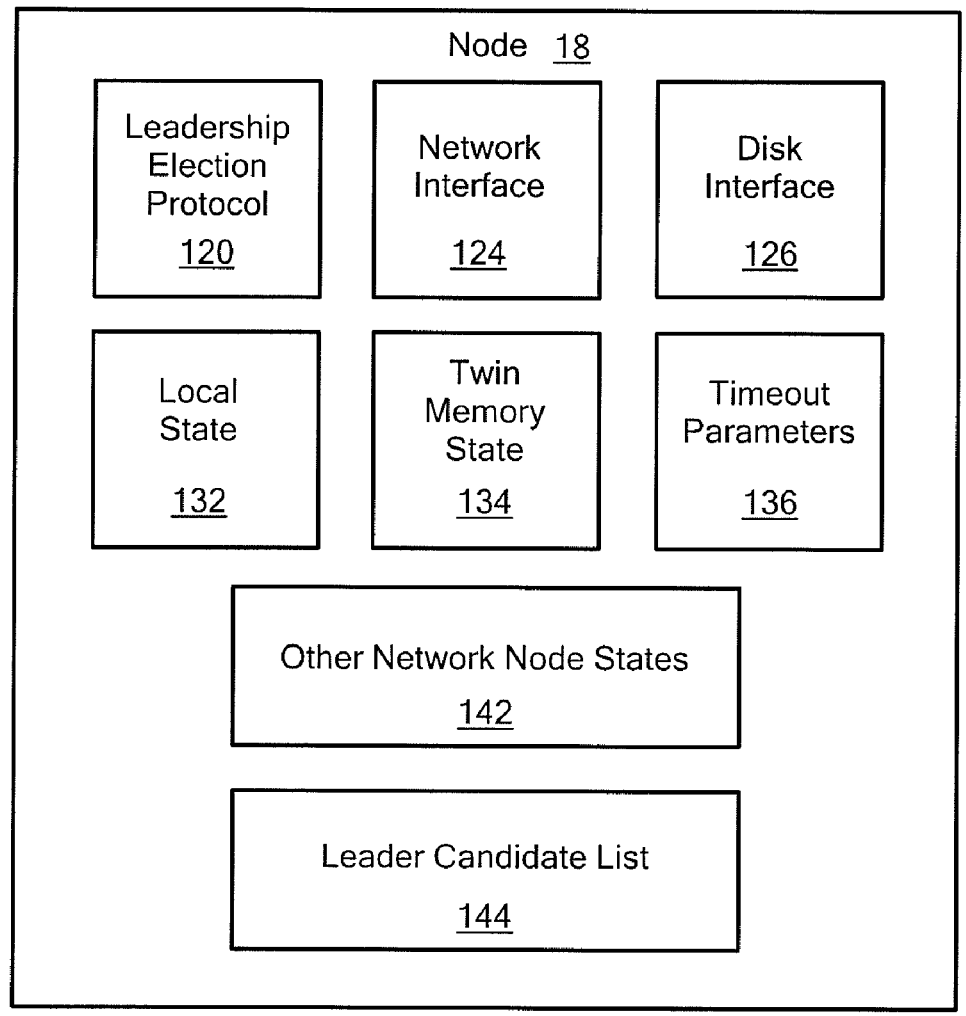
FIG. 5 is a block diagram of an example of a network node.

Referring to FIGS. 4 and 5, in one aspect of the invention, an example of a process to dynamically add a new node 18 to the network cluster 10 is a process 200. The new node 18 includes the same components as the nodes 12a, 12b, and 12c (FIG. 3). Adding a node is possible if there is a leader node. Otherwise, if no leader node has been elected adding a new node is not possible. The new node 18 determines if it is a part of the network cluster 10 (214). For example, the node 18 is in the network node list 116 or if the leader node 12a acknowledges the node 18 as a member. If after the new node 18 is powered up and connected to the network, the new node is a part of the network cluster 10, then the LEP 120 of the new node 18 is initiated (232).

If after the new node 18 is powered up and connected to the network cluster, the new node is a non-member of the network cluster 10 (non-initialized), then the new node 18 notifies the leader node (218). The leader node adds the new node 18 to the network node list 116 (222). For example, the leader node receives a request from the new node 18 to join the network cluster 10 and the leader node writes the new node ID to the network node list 116 in the storage array 118. The leader node notifies the new node 18 that it has joined the network cluster 10 (224) and starts its LEP 120 (232). In this example, even though LEP 120 is started, the node 18 is not a leader candidate node and therefore is a member and cannot become a leader node unless there is a re-election process (e.g., a process 300 in FIG. 7). In one example, the network node states 119 are updated to include the state of the new node 18. In one example, running LEP 120 on a non leader candidate node (e.g., node 18) is the same as a leadership candidate node 12a, 12b except the non leader candidate node only maintains its local state 132 and does not maintain the twin state 134 or the network node states 142. In this example, only a leader candidate node is allowed to answer a network message from a non leader candidate node, this way a leader candidate node will be stable only if it can access the external storage or communicate with the leader node.

Figure 6:
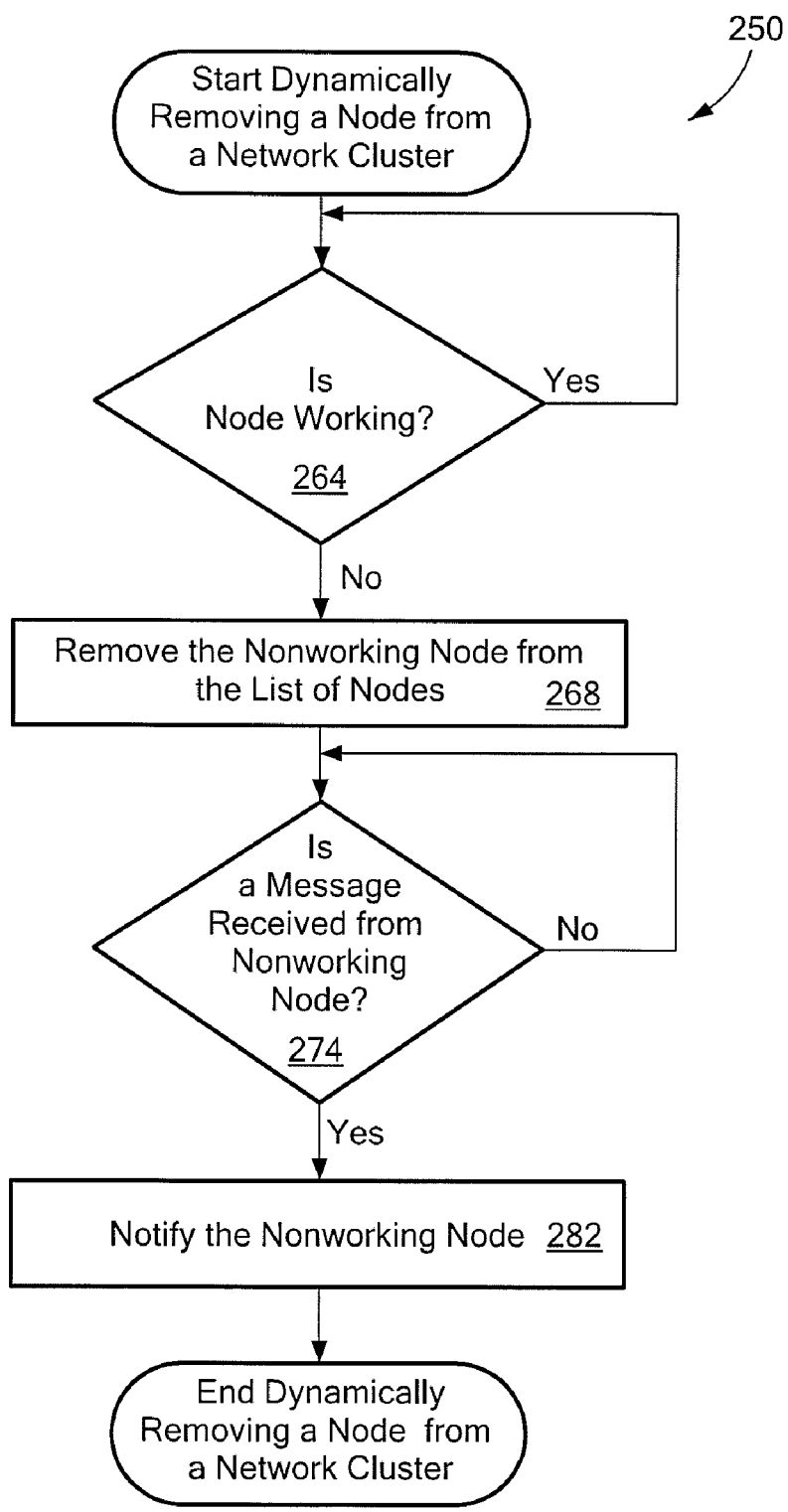
FIG. 6 is a flowchart of a process to dynamically remove a network node from the network cluster.

Referring to FIG. 6, in another aspect of the invention, an example of a process to dynamically remove a node (e.g., a node 12c) from the network cluster 10 is a process 250. The leader node determines if a node is dead (264). For example, the leader node, using the network interfaces 124 and the disk interface 126, determines that a node has been nonresponsive for a predefined period of time (e.g., for more than 10 minutes). The nonworking node is removed from the network node list 116 (268). For example, the leader node removes the node ID of the nonworking node from the network node list. If a message is received from the nonworking node (e.g., by the host 12a) (274), the nonworking node will be notified (e.g., by the leader node) that it is no longer part of the network cluster 10. In order for the nonworking node to now be a part of the network cluster 10, it rejoins the network cluster, for example, using the process 200. In one example, the other network node states 120 are updated to remove the state of the node 12c.

Figure 7:
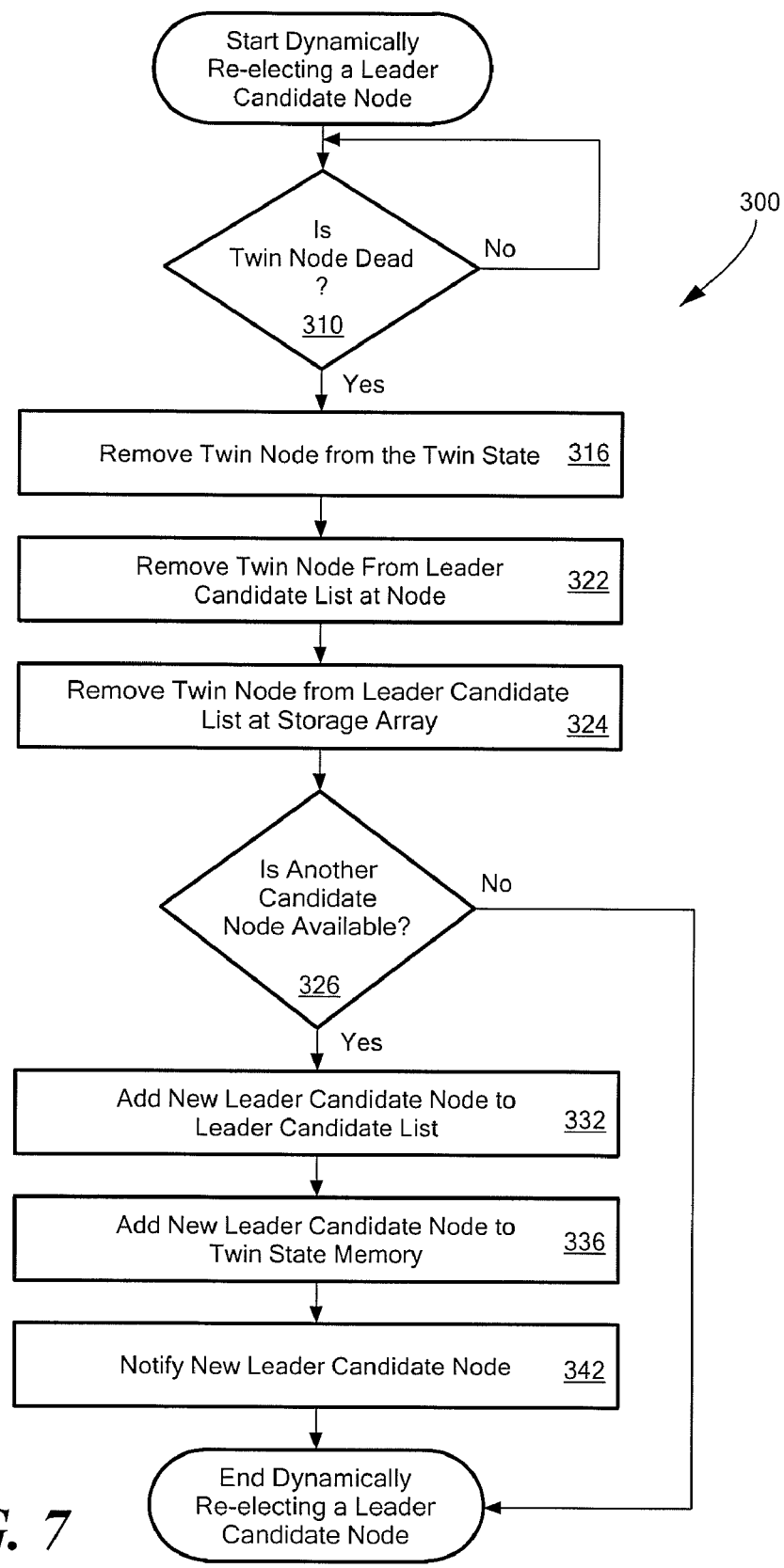
FIG. 7 is a flowchart of a process to dynamical re-elect a leader candidate node.

Referring to FIG. 7, in further aspect of the invention, the LEP 120 may be used to dynamically re-elect a leader candidate node. For example, in a cluster of more than two nodes, if one of the leader candidate nodes fails, the network loses its redundancy (i.e., there is no longer two leader candidate nodes) and a single point of failure exists. If there are duplicate network nodes (e.g., a node 18 capable of being a leader candidate node), and the leader candidate node is dead for a long period (e.g., 3 minutes), the dead leader candidate node is removed from the leader candidate list 118 using the LEP 120 and the duplicate network node is added as the other leader candidate node to restore redundancy. If and when the old leader candidate node is up again, the old leader candidate node will not be able to become a leadership candidate node.

In one example, a process to dynamically re-elect a leader candidate node is a process 300. In one example, the process 300 is used if a leader node exists and access to the storage array 16 is available. The leader node determines if its twin node is dead (310). If the twin node of the leader node is dead, the twin node is removed from the leader candidate list 144 and from twin memory state 134 of the leader node (316). The leader node, for example, removes the twin node from the candidate list 118 in the storage array 16 (322) and removes the twin node from the candidate list 144 (324). The leader node, for example, determines if another node is capable of becoming a leadership candidate (326). For example, if another node is a member of the network cluster 10 (i.e., the other node joined the network cluster 10 and the leader node knows the other node is alive and the other node knows that the leader node is alive). If another node is capable of being a leader candidate node, the node is added to the leader candidate list 118 in the storage array 16 (332). The leader node adds the new leader candidate node to the candidate list 144 and updates its twin memory state 134 (336) and notifies the new leader candidate node that it is a leader candidate node and its new twin node (342). In one example, the node 18 will restart running its LEP 120 as a leader candidate and start updating its local state 132 and its twin state 134 and other node states.

Figure 8:
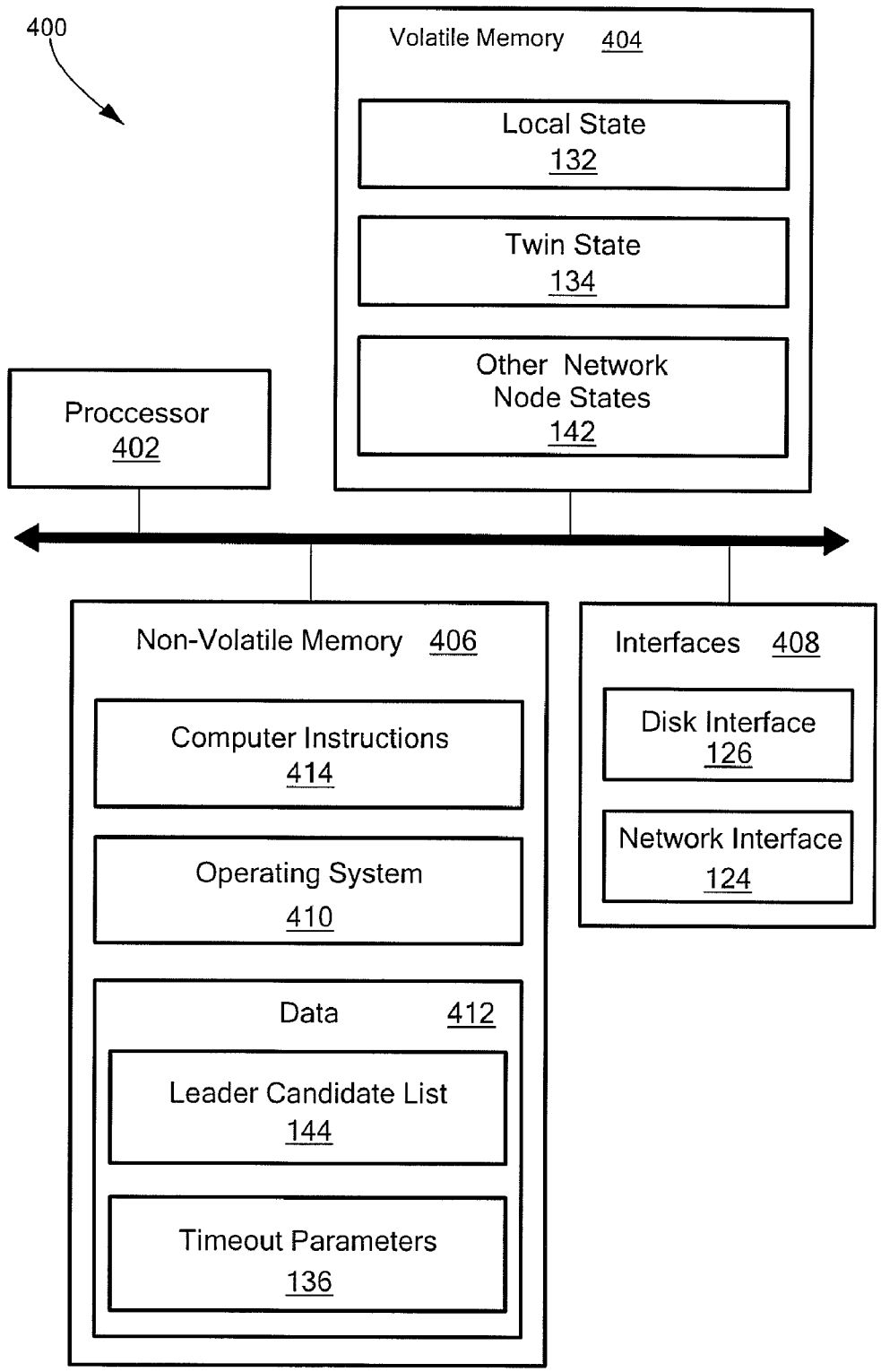
FIG. 8 is a computer on which the processes of FIGS. 4, 6 and 7 may be implemented.

FIG. 8 shows an example of a node in the network cluster 10 (e.g., a node 12a and a node 12b) as a computer 400, which may be used to execute all or part of processes 200, 250 or 300. Computer 400 includes a processor 402, a volatile memory 404 and a non-volatile memory 406 (e.g., hard disk). Non-volatile memory 406 includes an operating system 310, data 412 including leader candidate list 144 and time out parameters 136, and computer instructions 414. The volatile memory 404 includes local state 132 and twin memory state 134, and other network node states 142. The computer instructions 414 are executed out of volatile memory 404 to perform processes 200, 250 and 250 or portions of processes 200, 250 and 300.

The processes described herein (e.g., processes 200, 250 and 300) are not limited to use with the hardware and software of FIG. 8; they may find applicability in any computing or processing environment and with any type of machine or set of machines that is capable of running a computer program. The processes may be implemented in hardware, software, or a combination of the two. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any portion of the processes (e.g., processes 200, 250 and 300) and to generate output information.

The processes described herein are not limited to the specific embodiments described herein. For example, the processes are not limited to the specific processing order of the processing blocks in FIGS. 4, 6 and 7. Rather, any of the processing blocks of FIGS. 4, 6 and 7 may be re-ordered, combined or removed, performed in parallel or in serial, as necessary, to achieve the results set forth above.

The system described herein is not limited to use with the hardware and software described above. The system may be implemented in digital electronic circuitry, or in computer hardware, firmware, software, or in combinations thereof.

Processing blocks in FIGS. 4, 6 and 7 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other to embodiments not specifically set forth above. Other embodiments not specifically described herein are also within the scope of the following claims.

What is claimed is:

1. A method of dynamically adding a new node to a network cluster, comprising:
   selecting a first node in the network cluster as a leader node;
   executing at the first node a leader election protocol configured to add nodes to and configured to remove nodes from the network cluster;
   determining if the new node is included in a list of nodes belonging to the network cluster;
   notifying the leader node if the new node is not included in the list;
   adding the new node to the list of nodes; and
   notifying the new node that the new node is a member of the network cluster.

2. The method of claim 1 wherein the network cluster is in a storage area network (SAN), and further comprising writing the list of nodes to a storage array.

3. The method of claim 1, further comprising:
   storing at the new node an indication that it is a member of the network cluster; and
   storing at each node in the network cluster a list of leader candidate nodes.

4. The method of claim 3, further comprising
   designating a second node as a leader candidate node; and
   storing the first node and the second node as a leader candidate node on the list of candidate nodes at each node,
   wherein the second node is configured to be a new leader if the first node fails.

5. The method of claim 1, further comprising executing a leader election protocol at the new node.

6. A method comprising:
   adding a new node to the network cluster by notifying the leader node if the new node is not included in a list of nodes belonging to the network cluster stored at a storage array, adding the new node to the list of nodes belonging to the network cluster and notifying the new node that it is a member of the network cluster; and
   dynamically removing a nonfunctioning node from a network cluster, the dynamically removing comprising:
      selecting a first node in the network cluster as a leader node;
      executing at the first node a leader election protocol configured to add nodes to and configured to remove nodes from the network cluster;
      determining if a second node is functioning; and
      removing the second node from a list of nodes belonging to the network cluster if the second node is not functioning.

7. The method of claim 6 wherein determining if the second node is functioning comprises determining if the second node accesses a storage array within a predetermined time period.

8. The method of claim 6 wherein determining if the second node is functioning comprises determining that communication between the second node and the leader node has ceased for a predetermined time period.

9. The method of claim 6 wherein the network cluster is in a storage area network (SAN), and further comprising writing the list of nodes to a storage array.

10. The method of claim 6 wherein removing the second node from the list of nodes comprises the leader node removing the second node from the list of nodes.

11. The method of claim 6, further comprising:
    receiving a message from the second node; and
    notifying the second node that it is not a member of the network cluster.

12. The method of claim 6, further comprising storing at each node in the network cluster a list of leader candidate nodes.

13. A method comprising:
    dynamically re-electing a leader candidate node in a network cluster, the re-electing comprising:
       selecting a first node in the network cluster as a leader node;
       selecting a second node as a twin node using a leader election protocol, the twin node configured to become the leader node if the leader node fails;
       storing a twin state at the leader node to indicate the second node as the twin node, the twin state indicating the twin node is dead if the interfaces to access the twin node indicate that the twin node is not functioning;
       determining if the second node is malfunctioning;
       deselecting the second node from being the twin node by removing the second node from a the twin state of the leader node if the second node is malfunctioning;
       removing the second node from a leader candidate list if the second node is malfunctioning; and
       adding a new leader candidate node to the leader candidate list if the second node is malfunctioning.

14. The method of claim 13 wherein determining if the twin node is malfunctioning comprises determining if the twin node accesses a storage array longer than a predetermined time period.

15. The method of claim 13 wherein determining if the twin node is malfunctioning comprises determining that communication between the twin node and a node has ceased for longer than a predetermined time period.

16. The method of claim 13 wherein the network cluster is in a storage area network (SAN), and further comprising:
   writing the leader candidate list to a storage array;
   storing at each node in the network cluster the leader candidate list.

17. A method of dynamically managing a network cluster in a storage area network (SAN), comprising:
   selecting a first node in the network cluster as a leader node;
   selecting a second node as a backup leader node using a leader election protocol stored on each node;
   adding a new node to the network cluster by notifying the leader node if the new node is not included in a list of nodes belonging to the network cluster stored at a storage array, adding the new node to the list of nodes belonging to the network cluster and notifying the new node that it is a member of the network cluster;
   removing a nonfunctioning node from a network cluster by removing the node from the list of nodes belonging to the network cluster; and
   re-electing a leader candidate node in the network cluster if a twin node of the leader node is malfunctioning by removing the malfunctioning twin node from a twin state stored at the leader node, removing the twin node from a leader candidate list stored at the storage array and adding a new leader candidate node to the leader candidate list.

18. The method of claim 17, further comprising storing at each node in the network cluster a list of leader candidate nodes.

19. A network cluster in storage array network, comprising:
   a storage array comprising:
      a list of nodes in the network cluster; and
      a list of leader candidate nodes; the leader candidate nodes, comprising:
         a first node designated as a leader node;
         a second node designated as a twin node configured to become the leader node if the first node fails;
   wherein the network cluster is configured to dynamically re-elect a new leader candidate node by:
      determining if the twin node is malfunctioning;
      removing the twin node from a twin state stored at the first node;
      removing the twin node from the list of leader candidate nodes; and
      adding a new leader candidate node to the list of leader candidate nodes,
   wherein the network cluster is configured to dynamically add a new node by:
      determining if the new node is included in the list of nodes in the network cluster;
      notifying the leader node if the new node is not included in the list of nodes in the network cluster;
      adding the new node to the list of nodes in the network cluster; and
      notifying the new node that it is a member of the network cluster, and
   wherein the network cluster is configured to dynamically remove a malfunctioning node by removing the malfunctioning node from the list of nodes in the network cluster.

20. The network cluster of claim 19 wherein determining if the twin node is malfunctioning comprises determining that communication between the twin node and a node has ceased for longer than a predetermined time period.

* * * * *